June 18, 1968 — L. R. KLANG — 3,388,622

SPEED WRENCH

Filed Oct. 3, 1966

INVENTOR
LEON R. KLANG
BY Cohn and Powell
ATTORNEYS

United States Patent Office 3,388,622
Patented June 18, 1968

3,388,622
SPEED WRENCH
Leon R. Klang, Hickman Ave., Fulton, Mo. 65251
Filed Oct. 3, 1966, Ser. No. 583,555
2 Claims. (Cl. 81—177)

ABSTRACT OF THE DISCLOSURE

The speed wrench includes a pair of concentric, rotatively connected members. A handle is fixed to the inner member and a work-engaging arm, radially offset from the common axis of concentricity, is fixed to the outer member so that cranking of the handle rotates the work-engaging arm.

---

This invention relates generally to improvements in a speed wrench, and more particularly to improvements in a hand tool for rapidly and efficiently tightening or loosening a fastener.

An important object is achieved by the provision of a convenient self-contained hand tool so constructed and designed as to enable the user to grasp the tool with one hand and to engage and turn the work by simply moving the handle in a translatory cranking action with the same hand without disturbing the position or grip of the hand.

Another important objective is afforded by the provision of a speed wrench having a pair of rotatively connected members that define a rotative axis. A handle is fixed to one member, while an arm is fixed to the other member and defines a work-engaging axis laterally offset relative to the rotative axis. Translatory cranking movement of the handle about the work-engaging axis causes relative rotation of the members and rotation of the arm.

Still another important objective is attained by the structural arrangement in which the handle is fixed to the one member at the rotative axis of the rotatively connected members so that the handle will rotate with the members about the common rotative axis and yet will cause relative rotation of such members as the members are moved about the work-engaging axis upon cranking movement of the handle.

An important object is realized in that the rotatively connected members are concentrically related with one member located inside of the other member. It is advantageous that the handle is fixed to the inner member at the common rotative axis of the concentrically related members to achieve the functional results mentioned previously.

Another important object is achieved by the provision of a circular race and associated bearing elements carried by and rotatively interconnecting the said members. The race and bearing elements define the rotative axis.

Yet another important object is provided by the structural arrangement in which the pair of rotatively connected members include a bearing having an inner race and a concentrically related outer race with associated bearing elements therebetween. This bearing defines the rotative axis. The handle is carried by and rotatable with the inner bearing race, while the arm is carried by and rotatable with the outer bearing race.

An important object is afforded in that the handle is mounted to the inner race at the rotative axis so as to rotate with the inner race about the rotative axis, whereby the handle will not revolve in the hand of the user during cranking motion.

Another important object is attained by the structural arrangement in which the inner race has a center opening at the rotative axis, and the handle is located in this center opening and is fixed to the inner race so that the handle will not revolve in the hand of the user during cranking motion. A collar is fixed to and is located about the outer race. The arm is fixed to the collar so as to turn with the outer race as the inner and outer races are rotated about the work-engaging axis by the handle.

A further important object is to provide a speed wrench that is simple and durable in construction, economical to manufacture and assembly, highly efficient in operation, and which can be used by anyone with little or no instructions.

The foregoing and numerous other objects and advantages of the invention will more clearly appear from the following detailed description of a preferred embodiment, particularly when considered in connection with the accompanying drawing, in which.

Figure 1:
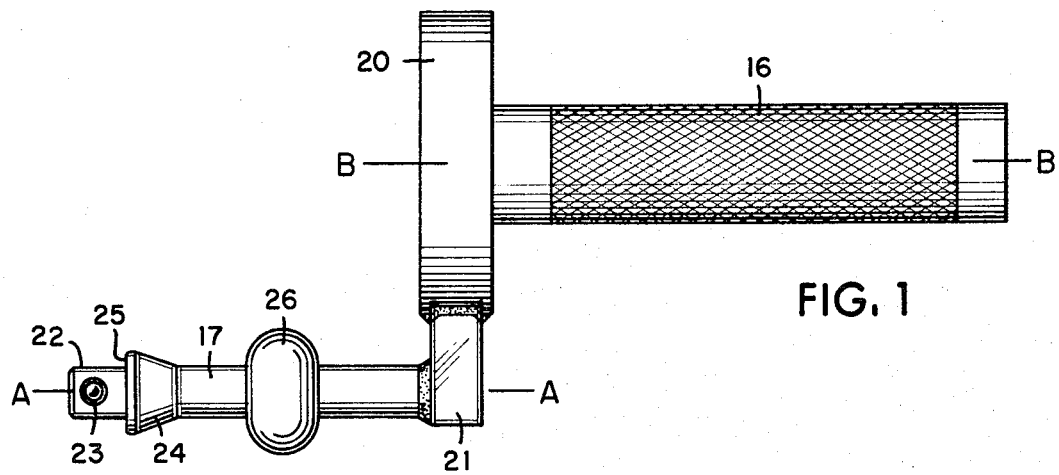
FIG. 1 is a side elevational view of the wrench.
Figure 2:
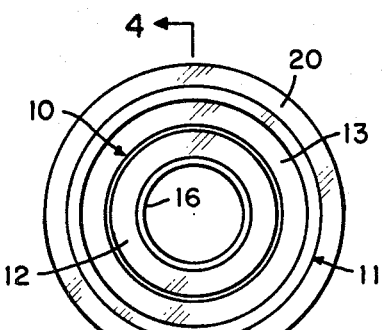
FIG. 2 is a front end view of the wrench as seen from the left of FIG. 1.
Figure 3:
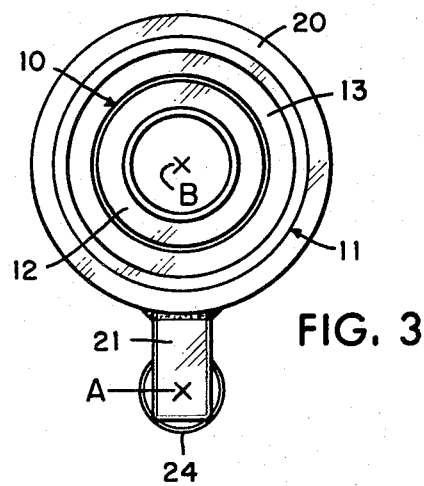
FIG. 3 is a rear end view of the wrench as seen from the right of FIG. 1.
Figure 4:
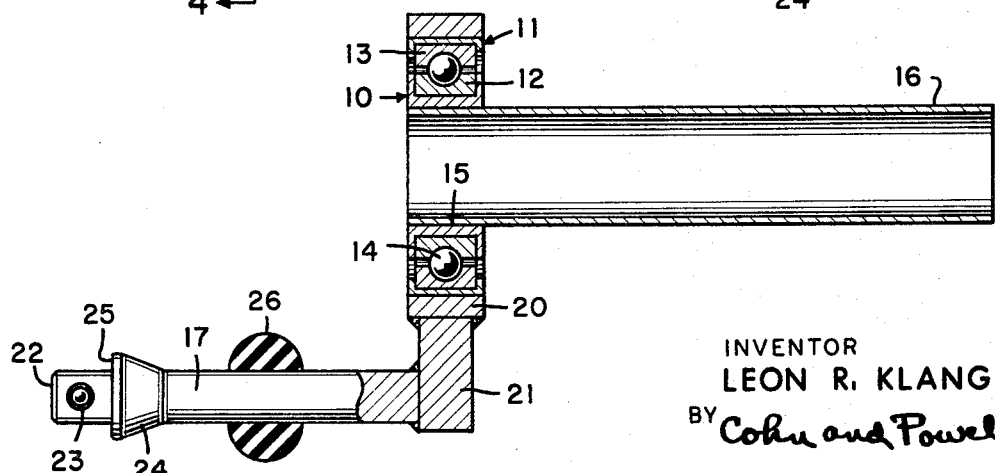
FIG. 4 is a cross-sectional view as taken along line 4—4 of FIG. 2.

Referring now by characters of reference to the drawing, it will be understood that the speed wrench includes a pair of rotatively connected members generally indicated by 10 and 11, defining a rotative axis B. The rotatively connected members 10 and 11 are concentrically related with member 10 located inside of the member 11.

Specifically, the inner and outer members 10 and 11 constitute a bearing having an inner race 12 and a concentrically related outer race 13 with associated ball bearings 14, constituting bearing elements therebetween. The inner race 12 provides a center opening concentric with the rotative axis B. The inner and outer races 12 and 13 revolve easily relative to each other about the common rotative axis B.

Fixed to the bearing member 10 is an elongate crank handle 16. More particularly, one end of handle 16 is located in the central opening 15 and is fixed to the bearing member 10 at the common rotative axis B of the concentrically related members 10 and 11. The handle 16 will rotate with the bearing member 10 about the rotative axis B.

An elongate arm 17 is fixed to the bearing member 11 and defines a work-engaging axis A laterally offset relative to the rotative axis B. It is seen that the arm 17 is carried by and is rotatable with the outer bearing race 13. The work-engaging axis A and the rotative axis B are arranged in parallel relation extending in the same direction.

Disposed about and fixed to the outer periphery of the outer race 13 is circular collar 20. Extending laterally from the collar 20 and radially from the bearing and the rotative axis A, is a lug 21. One end of the arm 17 is secured to this lug 21. The arm 17 rotates with the bearing member 11.

The work-engaging outer end of the arm 17 includes a square plug 22 adapted to receive suitable sockets (not shown). These sockets (not shown) are retained in the usual manner by a spring-actuated ball lock 23. The arm 17 includes a relatively enlarged portion 24 forming a forwardly-facing, annular shoulder 25 immediately to the rear of the square plug 22. The shoulder 25 is adapted to abut the sockets (not shown) to fix and position the sockets on the square plug 22.

For convenience in guiding and manipulating the speed wrench, a knob 26 is rotatively mounted on the length of arm 17, the knob 26 being of a convenient size to fit the user's hand.

It is thought that the functional advantages of the wrench have become fully apparent from the foregoing detailed description of parts, but for completeness of disclosure, the usage will be briefly described. It will be assumed that a suitable socket (not shown) has been placed on the square plug 22 and that the arm 17 is thereby adapted to engage a workpiece such as a nut (not shown).

The user grips the handle 16 with one hand and the knob 26 with the other hand to apply the socket (not shown) to the workpiece, and thereby effectively connect the work-engaging arm 17. Then, while the work-engaging arm 17 is held steady, the handle 16 is turned in a translatory cranking motion to move the bearing members 10 and 11 about the work-engaging axis A. During this cranking action, the inner bearing member 10 revolves inside of and relative to the outer bearing member 11, and the common rotative axis B is moved in an orbital circle about the work-engaging axis A. Consequently, the work-engaging arm 17 is rotated. Because the crank handle 16 is fixed to the inner bearing member 10, the handle 16 revolves with the inner bearing member 10 so that the handle 16 will not revolve in the hand of the user during cranking motion.

Although the invention has been described by making detailed reference to a single preferred embodiment, such detail is to be understood in an instructive, rather than in any restrictive sense, many variants being possible within the scope of the claims hereunto appended.

I claim as my invention:

1. A speed wrench, comprising:
   (a) a pair of spaced concentric, rotatively connected members defining a common rotative axis and including an inner member located within an outer member,
   (b) a handle fixed to the inner member,
   (c) an arm fixed to the outer member defining a work-engaging axis laterally offset relative to the common rotative axis,
   (d) translatory cranking movement of the handle about the work-engaging axis causing relative orbital rotation of the common rotative axis of the members about the work-engaging axis and causing rotation of the arm,
   (e) the pair of rotatively connected members include a bearing having an inner race and a concentrically related outer race with associated bearing elements operatively therebetween, the bearing defining the rotative axis,
   (f) the handle is carried by and rotatable with the inner bearing race, and
   (g) the arm is carried by and rotatable with the outer bearing race, the arm defining the work-engaging axis being laterally offset from the rotative axis,
   (h) the bearing laterally and operatively interconnects the handle and the arm, the cranking leverage being a function of the outer race diameter, and
   (i) the bearing provides stop means substantially precluding relative axial movement between the handle and the arm.

2. A speed wrench as defined in claim 1, in which:
   (h) the inner race has a center opening at the rotative axis,
   (i) the handle is a unitary elongate member and is located in the center opening and fixed to the inner race, whereby the handle will not revolve in the hand of the user during cranking motion,
   (j) a collar is fixed to and located about the outer race, and
   (k) the arm is fixed to the collar so as to turn with the outer race as the inner and outer races are rotated about the work-engaging axis by the handle.

References Cited
UNITED STATES PATENTS

| | | |
|---|---|---|
| 751,496 | 2/1904 | Gode. |
| 1,433,163 | 10/1922 | Walters _____ 81—177 |
| 2,290,807 | 7/1942 | Keeler et al. _____ 74—545 |

MILTON S. MEHR, *Primary Examiner.*